Patented Feb. 16, 1937

2,070,918

UNITED STATES PATENT OFFICE 2,070,918

COATED GASKET

Ruben O. Peterson, Glen Ellyn, Ill., assignor to Victor Manufacturing & Gasket Company, Chicago, Ill., a corporation of Illinois No Drawing. Application March 11, 1935, Serial No. 10,479

2 Claims. (Cl. 288—1)

This invention relates to an improved wax coating for gaskets, and has for one of its principal objects, the provision of a protective layer for gaskets or the like, particularly those used in the cylinder heads of internal combustion engines, wherein effective insurance will be provided against the undesirable leakage of water and other elements past the gasket and between the same and the cylinder head or block.

Another important object of the invention is the provision of a simple, readily applied, and economical means for protecting the joints between the cylinder heads and gaskets, and between the gasket and the engine block, whereby undesirable leakage will be effectively prevented at all times from the moment that the gasket is put into position and even before the motor has been operated.

Another and still further object is the provision of a novel, simple and efficient method of applying the improved coating of this invention to cylinder head gaskets or the like, whereby a sufficiently stable and desirable covering is provided with a minimum expenditure of time, labor and expense.

Another object is to provide a coating for gaskets or similar articles which shall be unobjectionable from the standpoint of shipping and handling in that it will not readily come off or stain the hands, clothing or other articles with which it comes into contact.

Other and further important objects of the invention will be apparent from the disclosures in the following specification.

The invention, in a preferred form, is hereinafter more fully described.

It has been found in practice that when a new gasket is applied to a motor block or cylinder head, there is a tendency for water in the water jacket to leak past the gasket into the cylinders, and this tendency is greatest immediately after the gasket has been applied and before the motor has been actually operated. Investigation has proven that there are minute irregularities, tool marks and imperfections in both the cylinder head and block, which irregularties and crevices were not completely filled by the gasket, especially when either one or both surfaces of the gasket are composed of metal. Some metals are more subject to this disadvantage than others, as, for example, the harder metals, as steel compared with copper or the like. Even when one of the faces of the gasket is composed of asbestos or similar packing material, some water leakage is likely to occur at the outset.

Steel jacketed or covered gaskets are somewhat cheaper than copper-clad or covered gaskets and also perform better in some instances, as, for example, in certain types of motors, and it is one of the purposes of this invention to provide such steel jacketed or covered gaskets with the improved coating of this invention so that this undesirable leakage of water, which has heretofore always taken place with gaskets of this type, is prevented. The particular value of the present coating is to prevent water leaks while the motor is still cold, and it has been found that while an ordinary gasket will leak water at one or two pounds pressure, the same gasket coated with the protective layer of this invention will resist water pressures up to twenty pounds or more.

It has also been found that the protective coating of this invention is highly desirable at the unbound outer edges of the gasket. Subsequent to the application of gaskets of this type, the same are tested for water leaks, and the water, contacting the unbound outer edges, has a tendency to soften and loosen the asbestos with the result that the same is sometimes extruded by the pressure on the gasket and a faulty seal eventually results. The wax coating of this invention applied to these unbound outer edges prevents such penetration and softening by water either during tests or afterwards in actual use.

A material which has been found especially applicable for the purposes of this invention is chlorinated naphthalene, but other wax-like materials or waxes, as, for example, paraffin, carnauba wax or the like, can be used, and various combinations may also be employed, such as mixtures of paraffin and carnauba wax, or mixtures of paraffin and chlorinated naphthalene, or other combinations of these and other similar ingredients in practically all proportions.

It has further been found that application of the improved coating of this invention is best made by applying the same to the surface of the gasket in thin layers or films by printing the same thereon, preferaby by running the gaskets through two heated rollers coated or covered with the wax coating of the invention. The rollers are heated to a point slightly above the melting point of the wax or waxy combination, and thereby just enough wax is applied, and a sufficient amount runs over the unbound edges to seal the same without any accumulation at the edges which is undesirable and which would result if the wax were applied by dipping.

Furthermore, the waxy surface makes a very good vehicle for carrying an additional layer, coating or admixture of a non-liquefiable lubricant such as graphite which will thereupon also act to assist in filling in the pores, tool marks or other imperfections in the cylinder head and block. The wax or combination of waxes must be such that a rather high melting point results without too much hardness, and the same must, of course, also be highly water-repellent.

The wax coating of this invention has a further advantage in that it has no tendency to stick to the cylinder head or block, and, therefore, the gasket can be readily removed for purposes of repairs or replacements, and the necessity of cleaning the block or head of undesirable adhering material is eliminated.

The wax coating also is applicable as an inexpensive rust preventer, and may be used with steel-covered gaskets, even though the steel is not plated, which is ordinarily considered necessary to prevent such rusting. Even after the steel has been plated, the cut edges, when the gasket forms are blanked out, are still subject to rust, and the application of this coating protects those cut edges.

It will be seen that herein is provided a coating which renders the use of steel possible in gaskets of this type, the steel having heretofore been considered rather undesirable, as it was harder than copper or aluminum, and would not conform to the minute irregularities or crevices in such a way as to prevent water leaks. Furthermore, the steel was subject to rusting. However, with the application of this wax coating, the minute pores, tool marks and irregularities in the cylinder blocks and heads are satisfactorily filled and protected against water leaks, blow-outs and the like, and the steel itself is effectively protected against rusting action.

Furthermore, if additional protection for the cut raw edges of the steel and the exposed edges of the asbestos is desired, the waxy coating of this invention may be applied to the gaskets in stacks by spraying or the like, either before or after the surface coating operation.

I am aware that many changes may be made in the ingredients and numerous details in the process varied throughout a wide range without departing from the principles of this invention, and I, therefore, do not purpose limiting the patent granted hereon otherwise than as necessitated by the prior art.

I claim as my invention:

1. A metal clad cylinder head gasket having a protective water-sealing coating thereover, comprising a thin film of a mixture of chlorinated naphthalene, paraffin, and carnauba wax.

2. A coated metal clad gasket, the coating comprising a thin layer of chlorinated naphthalene and waxes and an additional layer of graphite thereover.

RUBEN O. PETERSON.